United States Patent [19]

Schneider et al.

[11] 3,869,714

[45] Mar. 4, 1975

[54] METHOD AND APPARATUS FOR CONTROLLING THE RISETIME OF A DIGITAL MAGNETIC RECORDING WAVEFORM

[75] Inventors: Richard C. Schneider, Longmont; Lawrence Viele, Jr., Boulder, both of Colo.

[73] Assignee: International Business Machines Corporation, Armonk, N.Y.

[22] Filed: Mar. 11, 1974

[21] Appl. No.: 449,864

[52] U.S. Cl. .................................................. 360/45
[51] Int. Cl. .............................................. G11b 5/09
[58] Field of Search ............ 360/39, 40, 41, 42, 45, 360/46

[56] References Cited

UNITED STATES PATENTS

| | | | |
|---|---|---|---|
| 3,067,422 | 12/1962 | Hunt | 360/45 |
| 3,159,840 | 12/1964 | Woo | 360/45 |

*Primary Examiner*—Vincent P. Canney
*Attorney, Agent, or Firm*—Gunter A. Hauptman

[57] ABSTRACT

Discrete magnetization areas on a magnetizable medium are switched by a magnetic field formed by current pulses through a magnetic head winding having relatively slow leading edge risetimes. The current risetime may be derived from conventional voltage pulses by alternately gating positive and negative timing circuits which control current flow. Passive circuit elements may also control the leading and trailing edge timing.

13 Claims, 13 Drawing Figures

METHOD AND APPARATUS FOR CONTROLLING THE RISETIME OF A DIGITAL MAGNETIC RECORDING WAVEFORM

CROSS-REFERENCE TO RELATED APPLICATION

Ser. No. 318,973, "Wasp-Waist Head for Flying Flexible Magnetic Storage Medium Over Head," by F. R. Freeman, W. R. Golz, and W. K. Taylor, filed Dec. 27, 1972, and commonly assigned.

BACKGROUND OF THE INVENTION

1. Field of the Invention

This invention relates to digital magnetic recording and more particularly to a method and apparatus for improving the quality of the signal recovered by controlling the shape of the digital signal recorded.

2. Description of the Prior Art

Undesirable distortion may occur when digital input voltage signals, recorded as saturated binary magnetization patterns on a media, such as magnetic tape or discs, are detected and reproduced as digital output signals. Ideally, the input and output voltage signals will be essentially identical. As a practical matter, however, the recording process introduces a number of nonlinearities, making it difficult and sometimes, under extreme conditions, impossible to derive accurate output signals. One form of distortion is known as "peak shift" because the peaks of the signals detected from recorded magnetization patterns are displaced in time from their proper positions. This displacement appears to be a function of the duration of the detected signal. In certain digital recording techniques, especially phase encoding (PE) or phase modulation, where the detected signal contains varying duration pulses, interpulse transitions may be lost when a greatly shifted long pulse peak overrides and crowds out a short pulse peak subject to a lesser shift. Similar adverse effects occur in other digital recording schemes such as non-return-to-zero (NRZ and NRZI), frequency modulation, etc. It is possible that peak shift in digital recording is another form of the phenomenon known as phase shift in analog (audio and video) recording, where different frequency components of the recorded signal are detected with correspondingly different phase shifts. However, solutions to problems in the analog recording art have not been uniformly applicable to the digital recording art due to differences in the bandwidths recorded, recording densities, recording current amplitudes available and the number of levels recorded, saturation of the recording medium, relative headmedium velocities, permissible error rates, etc.

U.S. Pat. No. 3,503,059 (Ambrico, filed Mar. 22, 1967, and issued Mar. 24, 1970) teaches the reduction of undesirable pulse shift by shaping the recording signal. In general, Ambrico's recording signal exhibits an enhanced leading edge, such as a step. In U.S. Pat. No. 3,618,119 (Rodriguez, filed Mar. 13, 1970, and issued Nov. 2, 1971), the enhancement is obtained by an exponential decay from the leading to the trailing edge.

As explained in an article on page 2239 of the IBM TECHNICAL DISCLOSURE BULLETIN by J. A. Chaloupka and L. S. Frauenfelder entitled "Magnetic Head Write Driver," the purpose of recording-signal enhancement is to obtain a fast leading edge risetime. The effect of this risetime on the detected signal has been reported in several technical journals. A. Gabor, in an article entitled "High Speed Computer Bulk Storage" (AUTOMATIC CONTROLS, September, 1962, pages 36–41), shows that write head performance may be improved by speeding up the risetime of the recording current ("dynamic overdrive"). An article published in the IEEE TRANSACTIONS ON MAGNETICS (March, 1970, pages 95–100) by J. E. Lee and N. N. Truman shows that faster risetimes cause progressively less peak shift (transition delay time) and, to a point, desirably narrower transition lengths. In another article in the same journal entitled "Saturation Magnetic Recording Process" (March, 1971, pages 4–16), R. O. McCary states that it is undesirable to reduce the rate of change (risetime) of recording current. Also, U.S. Pat. No. 3,188,616 of Simon (filed Aug. 17, 1961, and issued June 8, 1965) provides a compensating network which reduces power dissipation in head driving circuits "without adversely affecting the switching speed of the circuit."

Contrary to the teachings in the prior art above, Applicants have failed to detect sufficient improvement in the performance of a recent class of digital magnetic heads when the recording signal transition risetime was speeded up. For example, the head disclosed in the cross-referenced Freeman et al application is intended to write encoded NRZI recording signals on a single track at a relative velocity of 1,000 inches per second and a density of 7,000 bits per inch while separated from the tape by a height in the range of approximately 20–50 microinches. Since the head is very small (about 80 mils by 140 mils in cross-section), the recording current capacity of the head winding is, of necessity, rather low (on the order of less than 250 ma peak). With these parameters, peak shift distortion becomes especially detrimental, assuming that the detection circuits associated with a read head, for example similar or identical to the referenced head, are capable of isolating from each other detected signals having peaks shifted from their normal positions by as much as 20 percent of the shortest wavelength. Individual shifts exceeding 20 percent would be unacceptable. However, experimentation and statistical observation have shown that for the parameters given, peak shifts exceeding 20 percent frequently occur causing unacceptable errors.

U.S. Pat. No. 3,573,770 of Norris (filed Nov. 1, 1967, and issued Apr. 6, 1971) records phase-modulated digital data in nonsaturated analog form after predistorting the phase relationships to compensate for phase distortion inherent in the recording and recovery system. The predistortion is achieved by a filter circuit which acts upon a continuous phase-modulated wave recorded as a corresponding continually varying flux pattern. It is expressly stated that no attempt is made to establish saturated binary flux reversals (of the type utilized in Applicants' invention).

Prior art in the fields of audio and video magnetic heads shows a variety of techniques for improving detected signals by shaping the recorded signal to the connected circuits. However, none of the problems in this art are directly analogous to the problem of signal peak shift occurring in high density digital recording. For example, U.S. Pat. No. 2,868,890 of Camras (filed Sept. 4, 1953, and issued Jan. 13, 1959) discloses linear recording over a range of signal amplitude variations by distorting the signal in a manner inverse to the nonlinearities in the magnetic transfer characteristics of the medium. Nothing is said about peak shift inasmuch as the nonlinearities referred to appear to be a function of varying recording signal intensity—a problem not relevant to digital recording.

SUMMARY OF THE INVENTION

Applicants have found that an unexpected improvement in peak shift compensation and output readback signals may be obtained by slowing the risetime of the recording signal transition instead of speeding it up as uniformly taught in the prior art relating to digital magnetic heads. Where the system performance is at the limit of performance of a technology, then small improvements in percentage peak shift will result in significant error rate reduction. For example, if the technological limit is 20 percent, a mean peak shift of 18 percent statistically results in many errors, while a mean peak shift of 15 percent will result in a significantly reduced error rate.

The risetime is chosen so that there is relative medium-head motion of approximately half of a magnetization pattern past a fixed reference point during the time the recording signal rises from its minimum to its maximum value. A variety of active signal generators or passive circuits may approximately time and shape the recording signal. For example, a differentially driven amplifier may be controlled by changing timing capacitors beginning at times indicated by input data. Alternatively, the risetimes of separately generated recording current pulse leading and trailing edges can be obtained by a parallel resistor or the like.

The foregoing objects, features and advantages of the invention will be apparent from the following more particular description of preferred embodiments of the invention, as illustrated in the accompanying drawings.

BRIEF DESCRIPTION OF THE DRAWINGS

Referring now to FIG. 1, a circuit for controlling the risetime of a digital magnetic recording waveform supplied to a magnetic head will be described. A head 1 is mounted on a support 2 and includes poles 3 having a gap 4 and a winding 5 to which are connected leads 6. The head 1 is placed in proximate relation to a magnetic medium 7 which may be a magnetic tape, disc, drum, loop, etc. The head is shown as having a single track, but may have additional tracks or may have additional poles 3 to permit both reading and writing. For purposes of this example, it is assumed that the head 1 is writing a single track on the medium 7 in response to current in the leads 6.

Figure 1:
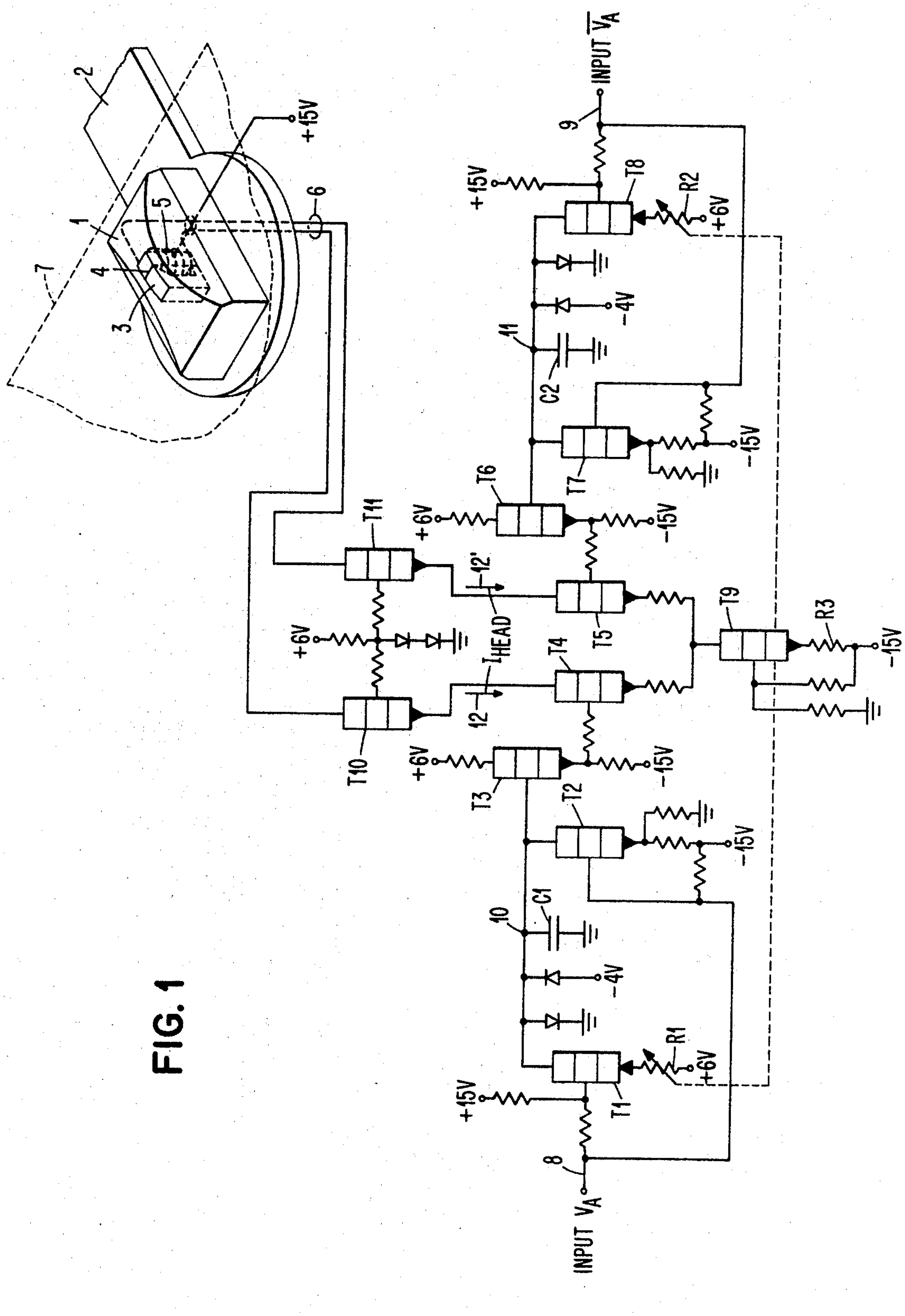
FIG. 1 shows a magnetic head connected to a circuit embodying the invention.
Figure 2A:
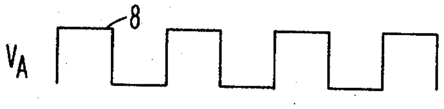
FIGS. 2A through 2F are waveform diagrams illustrating signals occurring in the head and circuit of FIG. 1.
Figure 2B:
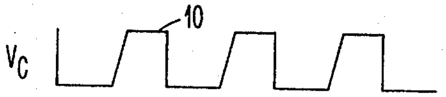
Figure 2C:
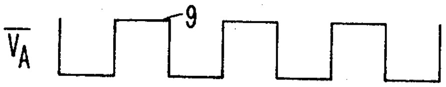
Figure 2D:
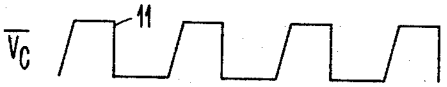

Input information signals which are in binary form and are encoded in accordance with any one of a number of common encoding schemes are supplied as complementary signals $V_A$ and $\overline{V}_A$ to inputs 8 and 9. The input voltages $V_A$ and $\overline{V}_A$ are illustrated in FIGS. 2A and 2C. When input $V_A$ goes negative, transistor T1 conducts, closing a charging circuit comprising resistor R1 and capacitor C1. The capacitor C1 voltage linearly increases with time and the slope of the voltage is inversely proportional to the product R1C1 of the resistance and capacitance which may be changed by varying the resistance R1. While the transistor T1 remains conductive, the capacitor C1 charges through the resistor R1 causing an increasing voltage $V_C$ at point 10 as illustrated in FIG. 2B. Eventually, the charge at point 10 equals the voltage $V_A$ and will remain there for the duration of the negative portion of the voltage signal $V_A$. When input voltage $V_A$ goes positive, transistor T1 becomes nonconductive, disconnecting the capacitor C1 from the charging path, and transistor T2 becomes conductive, providing a discharge path to ground. This causes the voltage $V_C$ at point 10 to drop rapidly to zero. The voltage at point 10 operates a transistor T3 which is connected to transistor T4 which in turn controls the flow of head current $I_{Head}$ 12 in the direction shown through the winding 5. An identical half of the circuit described is operated simultaneously by a complement input $\overline{V}_A$ applied just at input 9 to provide a complete circuit for the head current $I_{Head}$. Thus, during a positive portion of the input signal $V_A$, the negative input $\overline{V}_A$ will permit a current 12' to flow in a direction opposite to current 12 through the winding 5.

Figure 2E:
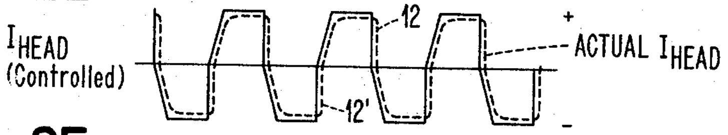
Figure 2F:
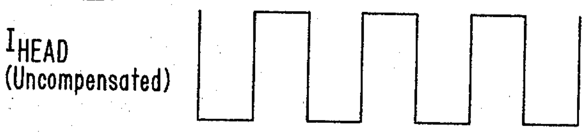

Referring to FIG. 2E, the actual current through the head 12 and 12' is shown by dashed lines. The controlled current, shown by the solid line, does not actually occur due to the inductance of the winding 5, capacitance of lead 6, and other factors. For comparison, in FIG. 2F, there is shown head current that would occur in the absence of the circuit just described.

Figure 3:
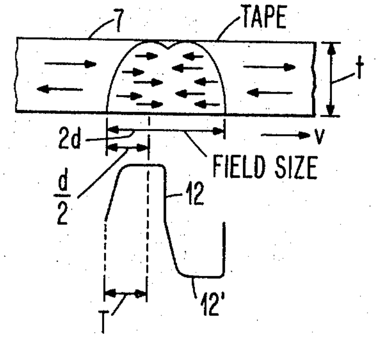
FIG. 3 illustrates the dimensions of magnetization patterns on media portions.

Referring to FIG. 3, there is shown a medium 7 and a discrete area thereon which has been magnetized by a current $I_{Head}$ shown below the medium 7. The medium 7 and a source of $I_{Head}$ current have relative velocity v. The arrows on the medium 7 cross-section symbolically represent the magnetic polarization of discrete particles on the magnetizable surface of the tape. A recording signal causes a magnetic field which will orient the normally random domain polarizations in one direction or the other, depending upon the direction of the current, as shown in FIG. 3. Inasmuch as this operation is well known, a detailed explanation is not deemed necessary. Each time that the recording signal $I_{Head}$ changes, a "bubble" or "domain" of oriented magnetic polarizations occurs. For a positive head current 12 followed by a negative head current 12', two bubbles with opposite orientations will occur as shown. The width of each bubble is d, and it is assumed that the medium (that is, that portion of the medium which is magnetizable) is saturated through a significant portion of its thickness *t*. The time required for the signal 12 to change from 0 to approximately 64 percent of its maximum value is T. A similar time applies to the negative signal 12'. $T_{opt}$ represents the risetime of the signal's leading edge. The relative velocity *v* is optimally related to the risetime T, as will now be explained with respect to FIGS. 4A–4B.

Figure 4A:
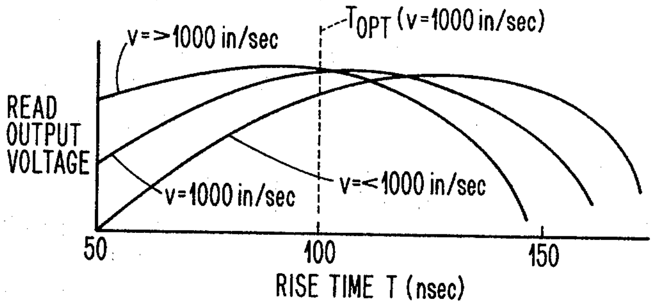
FIGS. 4A–4B are graphs illustrating the operation of the invention.

Referring to FIG. 4A, the relationships risetime *T*, velocity *v* and a normalized output/read output voltage are experimentally indicated. For increasing risetimes *T*, a read output voltage is shown. The read output voltage is some indication of the degree of peak shift and other distortions. The relationships are valid for recording systems using thick media (*t* more than about 50 microinches), write head gaps exceeding approximately 50 microinches, and relative head-medium velocities exceeding about 500 inches per second. Experimentally, the risetime $T$, field size $2d$ and relative velocity $v$ are related by the expression:

$$T = d/v$$

Field size $2d$ and write current $I_{Head}$ are proportional and may be used interchangeably with suitable conversion constants. Graphically, for a given velocity and field size, the read output voltage reads a (desirable) maximum, for a given risetime, which is thus the optimum risetime $T_{opt}$ for these conditions. The output drops as the risetime is varied to either side of $T_{opt}$. As shown in FIG. 4A, an optimum risetime of 100 nsec applies to velocity of 1,000 inches per second. If the velocity is increased, the optimum risetime would be speeded up toward 50 nsec and if the velocity is decreased, the optimum risetime would be slowed toward 150 nsec.

Figure 4B:
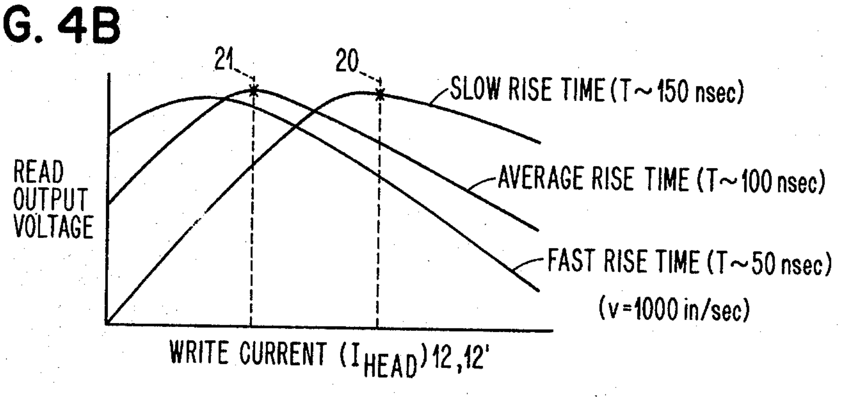

In FIG. 4B, the relationships between write current (or field size $2d$) and read output voltage for different risetimes are shown for a single velocity $v$ = 1,000. Note that for each write current (for example, 20) there is an optimum risetime (150 nsec for line 20) which gives the greatest output. Thus, for a risetime of 100 nsec, less write current (line 21) gives better output. In general, low write currents require fast risetimes.

One approach, therefore, is to independently select a tape speed and density for data rate requirements; then to select a write current which gives maximum output. Thus, write current can then be used to experimentally determine the field size. The field size and tape speed information can then be used in the formula to determine the proper risetime. In some cases, the combination may not be compatible; for example, if the optimum risetime is found to be 150 nsec, where the density and speed requirements require a flux reversal every 100 nsec, in which case a compromise must be made.

Figure 5A:
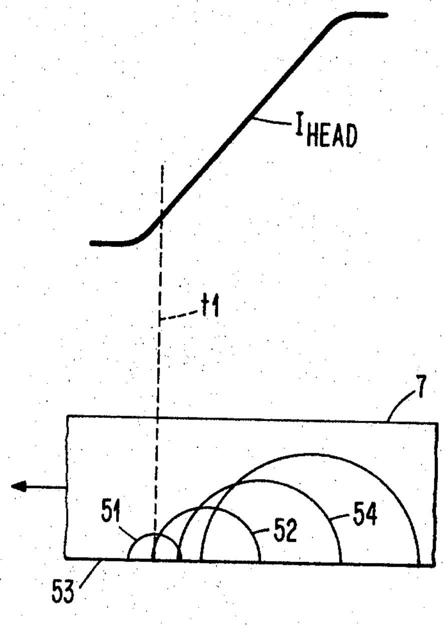
FIGS. 5A–5C illustrate magnetization patterns on media portions caused by different head current transitions.
Figure 5B:
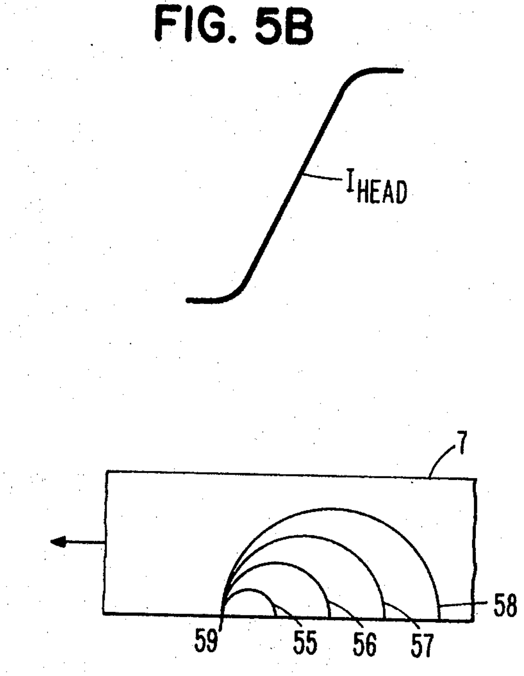
Figure 5C:
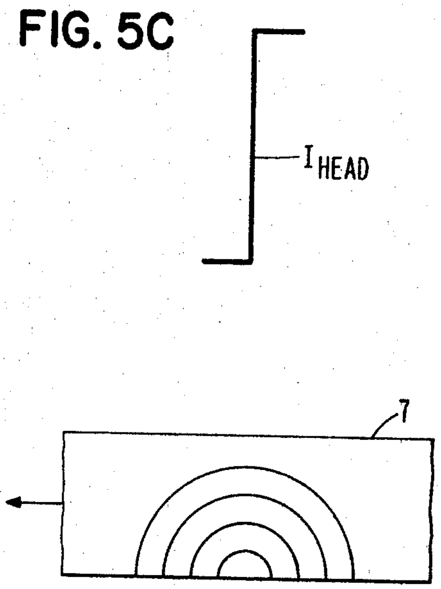

Another explanation of the invention is based upon FIGS. 5A–5C. In FIG. 5A, a write current $I_{Head}$ with a slow risetime produces a magnetic field transition which orients magnetic particles on the tape 7 in semicircular portions, bubbles, or domains having diameters determined by the instantaneous current $I_{Head}$ value. While, for example at time t1 portion 51 is formed, it will be understood that a continuous sequence of portions are formed. In the slow risetime case, each portion moves with the tape 7 at a rate that the next larger portion 52 formed passes through the tape surface 53 at different points than did the previous portion 51 or the subsequent portion 54. However, for an optimum current, shown in FIG. 5B, each portion 55-58 passes through the tape surface 53 at a common point 59 due to the relationship of the tape velocity and current risetime. In FIG. 5C, if the write current is changed instantaneously, all portions appear at once and pass through the tape surface 53 at different points. Experimentation has shown that the results achieved with a write current/velocity relationship of FIG. 5B are optimum and that speeding up the risetime as shown in FIG. 5C not only offers no improvement, but may degrade performance.

While the invention has been particularly shown and described with reference to preferred embodiments thereof, it will be understood by those skilled in the art that various changes in form and details may be made therein without departing from the spirit and scope of the invention.

What is claimed is:

1. In a magnetic recording system wherein digital signals represented as binary electric recording current are applied to a magnetic transducer which produces a corresponding magnetic field for recording saturated binary magnetization patterns on a magnetic medium, said recording current including:

a first half-cycle having a first polarity, a shallow leading edge and a relatively steep trailing edge; and a second half-cycle immediately following the first half-cycle, having a polarity opposite the first polarity, a shallow leading edge and a relatively steep trailing edge.

2. The system of claim 1 wherein the transducer and medium are in relative motion at a velocity $v$, the magnetization patterns have a dimension $d$, and the risetime of the leading edges is on the order of $d/2/v$.

3. Means for generating a current to a transducer for recording digital information signals as saturated magnetic indicia on a magnetic medium, comprising:

a source of binary recording current;

first control means, connected to said source, for varying the current with respect to time as a function of information signals to assume the shape of alternating positive and negative going periodic pulses lying between two levels on each side of a zero axis; and second control means, connected to said source and to said first control means, for causing the leading edge of each pulse to change from the zero axis to one of the levels during a period which is a substantial portion of the period of that pulse.

4. The means of claim 3 wherein the transducer and medium are in relative motion and the leading edge period is substantially a function of the dimension of the magnetic indicia and the relative velocity of the transducer and medium.

5. A circuit for supplying a recording current to a magnetic head utilized to record as saturated magnetic indicia on a magnetic medium digital information represented by the recording current during relative head-medium motion, including:

an information signal source for supplying digital binary information signal pulses having a fixed duration with steeply rising leading and trailing edges;

a controllable time constant device, connected to the source, for converting steeply rising information signal pulses to a pulse having the same duration as the signal pulse and a controlled time constant leading edge;

a current source for supplying an electric current quantity; and a current gate, connected to the current source and to the time constant device for varying the current between two levels on each side of an intermediate value, the change of current from the intermediate value to each level occurring during a period which is a substantial portion of the pulse duration.

6. The circuit of claim 5 wherein the period during which the current changes from the intermediate value to a level is a function of the indicia dimension and the head-medium velocity.

7. A method of generating a current for saturated recording of magnetic indicia on a magnetic medium with a magnetic transducer, including the steps of:
- relatively linearly changing the current from a first intermediate value to a second value during a discrete first period of time;
- maintaining the current at the second value until a discrete second period of time (larger than, and encompassing, the first period) has passed;
- returning the current to the first intermediate value substantially instantaneously;
- relatively linearly changing the current from the first intermediate value to a third value during a discrete period equal to said first period;
- maintaining the current at the third value until a discrete period (larger than, and encompassing, the first period) has passed; and
- returning the current to the first intermediate value substantially instantaneously.

8. A circuit for generating from digital input signals controlled risetime write currents for saturated recording of magnetic indicia on a medium, comprising:
- two input driver transistors, connected to complementary input signal sources supplying uncontrolled leading edge risetime signals as a function of the input signals;
- two RC time constant control devices, each connected to one of the input driver transistors, for providing a controlled risetime signal for each uncontrolled risetime signal from the connected driver transistor;
- two discharge transistors each connected at the output of a different one of the RC devices and to the signal sources, for providing a rapidly falling trailing edge discharge time signal which is substantially the same as the uncontrolled trailing edge of the input signal;
- a plurality of current driver transistors connected to the RC time constant control device and the discharge transistors for providing two outputs complementary current signals with controlled risetime lead edges and rapidly falling trailing edges; and
- a transducer winding having two leads connected to the current driver transistor outputs for generating magnetic fields as a function of the currents from the transistors which record indicia on the medium.

9. In a magnetic recording system wherein digital signals represented as binary electric recording current are applied to a magnetic transducer which produces a corresponding magnetic field for recording saturated binary magnetization patterns on a magnetic medium, said recording current including:
- a first half-cycle having a first polarity and a shallow leading edge and a trailing edge; and
- a second half-cycle immediately following the first half-cycle, having a polarity opposite the first polarity, a shallow leading edge and a trailing edge.

10. The system of claim 9 wherein the transducer and medium are in relative motion at a velocity $v$, the magnetization patterns have a dimension $d$, and the risetime of the leading edges is on the order of $d/2/v$.

11. A method of generating a current for saturated recording of magnetic indicia on a magnetic medium with a magnetic transducer, including the steps of:
- relatively linearly changing the current from a first intermediate value to a second value during a discrete first period of time;
- maintaining the current at the second value until a discrete second period of time (larger than, and encompassing, the first period) has passed;
- returning the current to the first intermediate value;
- relatively linearly changing the current from the first intermediate value to a third value during a discrete period equal to said first period;
- maintaining the current at the third value until a discrete period (larger than, and encompassing, the first period) has passed; and
- returning the current to the first intermediate value.

12. A method of generating from input signals having leading edge transitions which change at a rapid rate, a current for saturated recording of magnetic indicia on a magnetic medium with a magnetic transducer, including the steps of:
- changing the current from a first intermediate value to a second value at a rate slower than said input signal transition rate;
- maintaining the current at the second value until a fixed period of time has passed;
- returning the current to the first intermediate value;
- changing the current from the first intermediate value to a third value at a rate slower than said input signal transition rate;
- maintaining the current at the third value until a fixed period has passed; and
- returning the current to the first intermediate value.

13. In combination:
- a magnetic medium having a surface and magnetic transducer adjacent said surface in relative motion at a fixed average velocity;
- a source of write current, connected to said transducer, for providing a change of current causing the transducer to produce a magnetic field transition which magnetically orients semi-circular portions of the medium adjacent thereto; and
- a circuit, connected to said source, for controlling the rate of said write current change to produce a plurality of successive magnetically oriented portions on the medium all having common points in a line parallel to the medium surface.

* * * * *

UNITED STATES PATENT AND TRADEMARK OFFICE

CERTIFICATE OF CORRECTION

PATENT NO. : 3,869,714

DATED : March 4, 1975

INVENTOR(S) : R. C. Schneider and L. Viele, Jr.

It is certified that error appears in the above-identified patent and that said Letters Patent are hereby corrected as shown below:

Column 6, line 21, "d/2/v" should read -- $\frac{d/2}{v}$ --.

Column 8, line 6, "d/2/v" should read -- $\frac{d/2}{v}$ --.

Signed and Sealed this

*second* Day of *August 1977*

[SEAL]

*Attest:*

RUTH C. MASON
*Attesting Officer*

C. MARSHALL DANN
*Commissioner of Patents and Trademarks*